(12) United States Patent
Eriksson et al.

(10) Patent No.: US 8,155,116 B2
(45) Date of Patent: Apr. 10, 2012

(54) CONTROL OF MOBILE PACKET STREAMS (75) Inventors: Anders Eriksson, Kista (SE); Gabor Fodor, Hässelby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 942 days.

(21) Appl. No.: 10/583,962

(22) PCT Filed: Feb. 27, 2004

(86) PCT No.: PCT/SE2004/000265
§ 371 (c)(1),
(2), (4) Date: Apr. 13, 2007

(87) PCT Pub. No.: WO2005/062558
PCT Pub. Date: Jul. 7, 2005

(65) Prior Publication Data
US 2007/0286185 A1   Dec. 13, 2007

Related U.S. Application Data (60) Provisional application No. 60/530,904, filed on Dec. 22, 2003.

(51) Int. Cl.
*H04L 12/56* (2006.01)
(52) U.S. Cl. ......... 370/389; 370/392; 370/231; 370/235
(58) Field of Classification Search ............... 370/389, 370/392; 709/223–229
See application file for complete search history.

(56) References Cited

U.S. PATENT DOCUMENTS

| 6,507,873 B1 * | 1/2003 | Suzuki et al. | 709/245 |
| 6,628,655 B1 * | 9/2003 | Fieschi et al. | 370/389 |
| 6,795,857 B1 * | 9/2004 | Leung et al. | 709/224 |
| 7,359,350 B2 * | 4/2008 | Kato et al. | 370/329 |
| 7,366,524 B2 * | 4/2008 | Watanabe et al. | 455/458 |

(Continued)

FOREIGN PATENT DOCUMENTS

EP   1 315 359   5/2003

OTHER PUBLICATIONS

International Search Report for PCT/SE2004/000265 dated Oct. 1, 2004.

(Continued)

*Primary Examiner* — Huy Vu
*Assistant Examiner* — Zewdu A Beyen
(74) *Attorney, Agent, or Firm* — Nixon & Vanderhye P.C.

(57) ABSTRACT

A method, device, and system control mobile packet flows forwarded between IP based networks. Individual packet flows on an IP user plane traverse middlebox functions that are controlled from a midcom agent. Each user flow registers its presence in each middlebox it encounters on its way from its source to its destination at the user plane. In response, each middlebox registers itself and the mobile flows it handles at the midcom agent with which they communicate using a midcom signalling protocol. The midcom agent comprises functionalities that its controlled middleboxes have and can provide control messages for how a middlebox shall handle a registered flow. The registration provides the midcom agent with knowledge of registered flows and middleboxes which allows the midcom agent to send control orders to the middleboxes that registered themselves, the orders pertaining to the handling of the flows at the respective middleboxes. A mechanism for control signalling at the IP control plane is described.

20 Claims, 6 Drawing Sheets

U.S. PATENT DOCUMENTS

| | | | |
|---|---|---|---|
| 7,420,943 B2 * | 9/2008 | Lakshmi Narayanan et al. | 370/331 |
| 7,437,145 B2 * | 10/2008 | Hamada | 455/410 |
| 7,477,648 B2 * | 1/2009 | Ota et al. | 370/401 |
| 7,580,401 B2 * | 8/2009 | Shew et al. | 370/351 |
| 2001/0021176 A1 * | 9/2001 | Mimura et al. | 370/235 |
| 2003/0093481 A1 * | 5/2003 | Mitchell et al. | 709/206 |
| 2003/0123388 A1 | 7/2003 | Bradd | |
| 2003/0206546 A1 * | 11/2003 | Beyda | 370/352 |
| 2003/0214945 A1 * | 11/2003 | Kawamura | 370/389 |
| 2004/0203765 A1 * | 10/2004 | Das et al. | 455/435.1 |
| 2004/0205245 A1 * | 10/2004 | Le Pennec et al. | 709/245 |
| 2009/0040995 A1 * | 2/2009 | Buddhikot et al. | 370/338 |

OTHER PUBLICATIONS

Network Working Group, Request for Comments: 3304, Aug. 2002, retrieved on Sep. 30, 2004 from the Internet: www.etsi.org.

* cited by examiner

CONTROL OF MOBILE PACKET STREAMS

This application is the US national phase of international application PCT/SE2004/000265 filed 27 Feb. 2004, which designated the U.S. and claims priority to U.S. Provisional Application No. 60/530,904 filed 22 Dec. 2003, the entire content of which is hereby incorporated by reference.

TECHNICAL FIELD

The invention relates to a method, network and devices for controlling mobile packet streams using middleboxes and midcom agents.

BACKGROUND

A mobile packet flow is a packet flow which during an ongoing communication session changes its way or route through the network, for example in consequence of a roaming mobile terminal or in consequence of a roaming mobile network.

Middleboxes and midcom agents (MIDdlebox COMmunication agents) are specified in [1] and [2]. Basically, middleboxes are intermediate devices in the Internet that require application intelligence for their operation.

Middleboxes may implement a large variety of network nodes, such as firewalls, network address translators (NAT), access routers and many other types of nodes. Middleboxes typically have corresponding application intelligence embedded within the device for their operation.

Middleboxes may enforce application specific policy based functions such as quality of service (QoS) control, resource management, packet filtering, virtual private network (VPN) tunnelling, intrusion detection, security and so forth.

Figure 1:
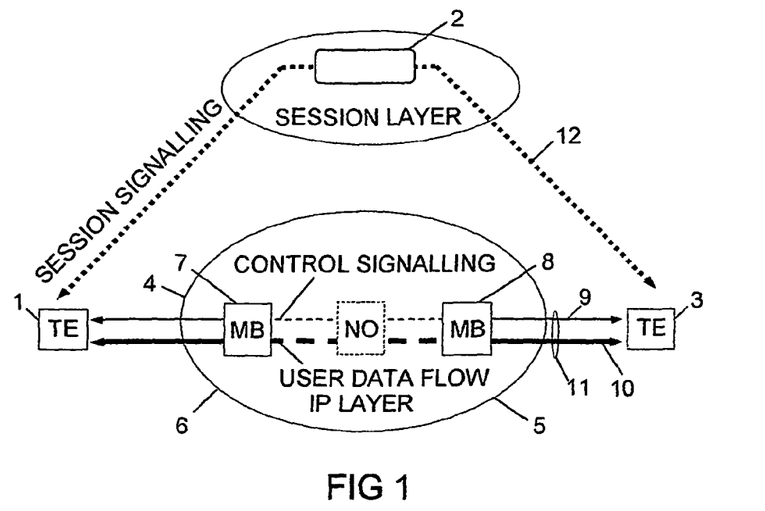
FIG. 1. is a block diagram showing middleboxes in different, non shown networks, and illustrates a common IP control plane and IP user data plane used for control signalling and user data transport in an IP based communication between two terminal equipments, FIG. 2. is a block diagram illustrating a first example embodiment wherein the IP control plane is separated from the IP user plane, FIG. 3. is a block diagram illustrating a second example embodiment wherein the IP control plane and the session control plane have been brought together, FIG. 4. is a block diagram illustrating registration of middleboxes and packet flows at an midcom agent, the block diagram also illustrating how midcom agents can interwork, FIG. 5. is a flow diagram of an example method, FIG. 6. is a block diagram illustrating non-desired control layer signalling between domains, FIG. 7. is a block diagram illustrating control layer signalling between domains, and FIG. 8. is a schematic block diagram illustrating an environment in which the technology described herein is used in order to control mobile packet flows.

FIG. 1 illustrates the use of middleboxes and according to [1], [2]. A user A of a terminal equipment, TE, 1 communicates with a session controller 2 in order to set up communication, for example a video call on the cellular network, with user B that has a terminal equipment, 3. User A sends a communication request to the session controller which communicates with the parties in order to set the conditions for the requested session, such as communication type, bandwidth and costs. This signalling is termed session signalling and takes place on a session layer. An example of a session layer signalling protocol is the Session Initiation Protocol (SIP). IP telephony is one example of a service supported by this protocol.

In the set up phase the terminal equipments also need to signal their individual needs, such as required bandwidth, to the nodes along the path the requested communication shall follow. This signalling is referred to as IP control signalling and takes place at an IP control plane 4 which in its turn takes place on the IP layer 5. The session controller reserves the resources required for a specific session.

An example of an IP control signalling protocol used on the IP control plane is the Resource Reservation Setup Protocol (RSVP) for resource reservation on the Internet. It is thus clear that signalling at both the session layer and the IP layer is needed in order to set up a session with reserved resources. As is well known the TCP/IP protocol suite has two separate signalling layers, one at the session layer, and one at the IP layer.

When the set up phase has finished user A is allowed to start the communication. Communication starts and the terminal equipments exchange packets. The packets from A to B and from B to A contain user data and together form a user data flow which follows a user data path on a user data plane 6 on the IP layer 5. In FIG. 1 the IP layer 5 is illustrated to comprises the IP control plane 4 as well as the user data plane 6. The user data path passes many middleboxes and nodes NO in many non shown networks along their way from source to destination. In FIG. 1 two middleboxes 7 and 8 and one node NO along this path are shown. Control functions for the user data flow are distributed among the middleboxes.

In FIG. 1 no midcom agent is shown. However, one can imagine that there is a midcom agent distributed among the middleboxes. Each middlebox would thus contain a part of a midcom agent. The above mentioned IP control signalling path between the terminal equipments and nodes and middleboxes on the IP control layer is illustrated by the thin double headed arrow 9 and the user data flow follows a user data path illustrated with the bold double headed arrow 10. In prior art, the user data plane and IP control plane are both on the IP layer 5 and the IP control signalling path 9 and user data path 10 are transported along a common channel 11. The session signalling is shown at double headed arrow 12 and may follow a different path than the common channel. The session controller must determine which routers and middleboxes the user data flow traverses so that it can direct control messages, related to the user data flow, to these nodes.

There is also a need to coordinate the resource utilization and the configuration of firewalls and other types of middleboxes. For coordination purposes, the use of a centralized control entity is favourable. The definition of such an entity, called a Midcom Agent, is addressed by the IETF Midcom working group [midcom]. According to a proposal from the working group the IP layer is divided into an IP control plane and a user plane.

A main drawback with prior art relates to control of moving user data flows. When the route of a flow is changed the combined user packet flow and IP layer signalling flow will encounter routers, middleboxes and other network nodes that have no knowledge of the flow and therefore don't know how to handle the flow, where it should be routed, which resources it requires, questions relating to authentication and accounting and many other considerations.

In accordance with the prior art this dilemma is solved in the following manner: a middlebox, sitting or located at the edge of a network and therefore called an edge middlebox, receives an unknown flow, starts an admission control of the flow in order to determine if the unknown flow should be granted access to the network. Via IP control signalling the edge middlebox receives knowledge of the flow, the bandwidth the flow requires and the identity of the entity responsible for the unknown flow. Having this knowledge the edge middlebox signals a database in order to verify that the entity responsible for the flow, usually a subscriber, is a trusted entity and has a subscription that encompasses the used bandwidth. This part of the admission control is termed policy control. Another part of the admission control is to check that the network has resources available for the unknown flow. This check is typically done using hop-by-hop signalling from one node to another along the path from source to destination in order to verify that the links have sufficient bandwidth free to accommodate the bandwidth of the unknown flow.

A problem with the existing proposal from the Midcom working group is that signalling messages for a specific session do not necessarily traverse the same routers and middleboxes as the user data flow of the session. The IP control plane must therefore determine which routers and middleboxes a specific user flow traverses so that it can direct control messages related to this flow to these nodes. The existing solutions in prior art handle policy control, or control of firewalls and address translators, but cannot provide communication for general purpose connection control between midcom agents and middleboxes.

In multi-access scenarios with multiple radio hops and requirements on session continuity in complex handover situations, the technology described herein proposes the use of an IP layer signalling protocol to transfer control messages to the middleboxes in order to ascertain that a user data IP flow is processed correctly.

The use of two separate signalling protocols to set up a session introduces unnecessary complexity and is a waste of bandwidth, especially over radio interfaces.

Processing of signalling information is not an instant process but takes a certain time at each middlebox. Signalling is therefore a slow serial process that jumps from one middlebox to another. The signalling delay taking place at one middlebox will add to the signalling delay at the next middlebox. In this manner delays are added and control signalling across the network is slow, in particular if the number of jumps is large.

Accordingly control of moving packet flows is a slow process. During the admission control process storage of the unknown flow at the edge middlebox is required so as to avoid loss of packets. This requires storage resources.

Another main drawback with the prior art relates to upgrading of the middleboxes. All of the middleboxes in a network need to be upgraded separately. Upgrading needs for example be made in case the existing control software of the middleboxes should be replaced with an evolved version of the control software.

Still another drawback with the prior art relates to feature interaction in middleboxes. Feature interaction appears when a middlebox has received an order to execute some predefined first processes and later on receives a new order to perform some other second processes. When the second processes execute they may interact in an undesirable manner with the first processes. The result is that the operation of the middlebox will be unpredictable. Different middleboxes contain different functionalities and the flows will thus be handled differently in different middleboxes.

SUMMARY

The technology described herein reduces the above problems to a great extent by providing a method, device and system for control of mobile packet flows.

By separating the user data plane from the IP control plane and register the flows with the midcom agent it is possible for the midcom agent to send control messages, related to individual user data flows, with only a minor delay to middleboxes, routers and other nodes along the paths the individual flows traverse. In other words, the signalling is faster and is done from one unit, the midcom agent.

Upgrading of software is facilitated since only one control entity, the midcom agent, needs to be upgraded. The upgraded midcom agent in its turn upgrades the middleboxes using an extended midcom protocol described below.

By having a central midcom agent it is possible to handle flows in a consistent manner and avoid feature interaction.

When a central midcom agent is used all signalling processing will take place there and the midcom agent can in its turn send control signals in parallel to the various middleboxes, thereby allowing for fast signalling. Signalling will take place in two steps, a horizontal signalling and a vertical signalling described below, but the delay is insignificant in relation to the serial multi jump signalling according to prior art.

By combining the IP control layer with the session layer signalling overhead over the air is reduced.

The signalling between a midcom agent and middleboxes is a master slave relation wherein the mideom agent acts as master and middleboxes as slaves in order to provide the above advantages. The slaves register with the master. In reference [4] the signalling relation between a middlebox and a policy decision point (PDP) is a client server relation where a middlebox or router acts as a policy client and the PDP as a policy server in order to provide policy decisions. Reference [4] is not concerned with mobile flows that during ongoing sessions change routers, middleboxes or policy server. Further, reference [4] is not concerned with general control of individual packet flows from a control plane.

DETAILED DESCRIPTION

Figure 2:
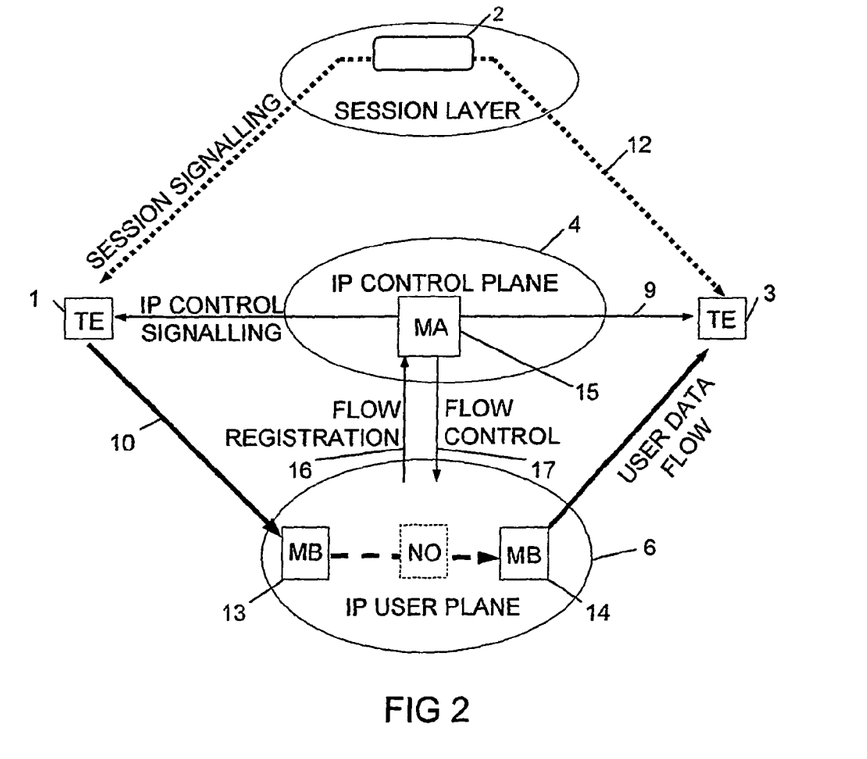

A first non-limiting, example embodiment is shown in FIG. 2. The session layer and session signalling is the same as in FIG. 1. The IP layer 5 is divided into an IP control plane 4 and a user data plane 6 and the IP control signalling path is made independent of the user data path. The IP control signalling path on the IP control plane will follow the IP control signalling path illustrated by the double headed arrow 9. The IP layer 6 is correspondingly changed and will transport user data on the IP user data plane. A user data flow is shown with broad arrows 10 and passes middleboxes 13, 14 and a plurality of other nodes schematically shown at NO on its way between terminals 1 and 3. A midcom agent 15 is arranged at the IP control plane and controls the middleboxes. The midcom agent comprises control functions for the middleboxes it controls and provides control orders relating to how the middleboxes shall handle an individual flow. These functions relate to resource management, resource control, QoS control, firewalls, network address translators, etc. The control function are performed according to the session parameters for bandwidth and QoS that are negotiated using the session layer signalling protocol.

Since user flows may change their paths in consequence of a mobile user or network, the IP control layer has not full control of the user flows. This dilemma is solved by letting the flows themselves tell the midcom agent where they are. Each user flow shall therefore register its presence at the middleboxes it encounters on the IP user data plane on its way from source terminal to destination terminal. The middlebox at which a flow registers will in turn report the identity of the reported flow and its own identity to the midcom agent. The middlebox reports its identity so that the midcom agent can find the control functions related to the reporting midcom agent and send corresponding control orders to the middlebox. In this manner a reporting middlebox continuously updates the midcom agent about its functional capabilities.

This combined flow and middlebox registration is schematically shown at vertical arrow 16. In response the midcom searches for the functions related to the individual flow and when these are found the midcom agent sends a corresponding flow control message or messages to the reporting middlebox. This flow control is schematically shown at vertical arrow 17.

The midcom working group has investigated protocols to be used as signalling protocols between middleboxes and a midcom agent and have found a couple of candidates, among these the standard Common Open Policy Service (COPS) protocol and the Simple Network Management Protocol (SNMP). None of these suggested midcom protocols, however, support flow registration in accordance with the technology described herein. Instead, the existing midcom protocols are complemented with information elements required for supporting flow registration and flow control, and the protocols so complemented will for reasons of simplicity be referred to as extended midcom protocols. With regard to FIG. 2, the extended midcom protocol represents vertical signalling, while control signalling at the IP control plane 4 represents horizontal signalling.

In FIG. 1 control signalling takes place stepwise from node to node. In each node the control messages are processed, slowing down the overall signalling. In FIG. 2 the number of processing units in series are smaller, just one (1) in the most favourable case. The vertical signalling is the reason why the signalling is quicker.

A similar registration procedure at the midcom agent takes place at each middlebox and node the flow traverses from source to destination. It is thus clear that once the registration has been made, the midcom agent can control the flow that initiated the registration. An example of a flow control activity in case the middlebox is a firewall is that it shall open up for a flow specified by the midcom agent.

There is a master slave-relation between the midcom agent and the flow specific state machine in a middlebox. The master-slave relation is used to allow the midcom agent to exercise control of the flow specific state machines in the middleboxes. The slave, a middlebox, registers with the master, the midcom agent. In the introductory portion of the specification the advantages have been described by making signalling at the IP control plane independent of the IP user data plane. A further advantage is that certain modularity in the signalling protocols is achieved.

An example means by which the IP layer is divided into an IP control plane and a user data plane is a packet marking mechanism which differentiates control packets from user packets as will be described in connection with FIG. 6.

Figure 3:
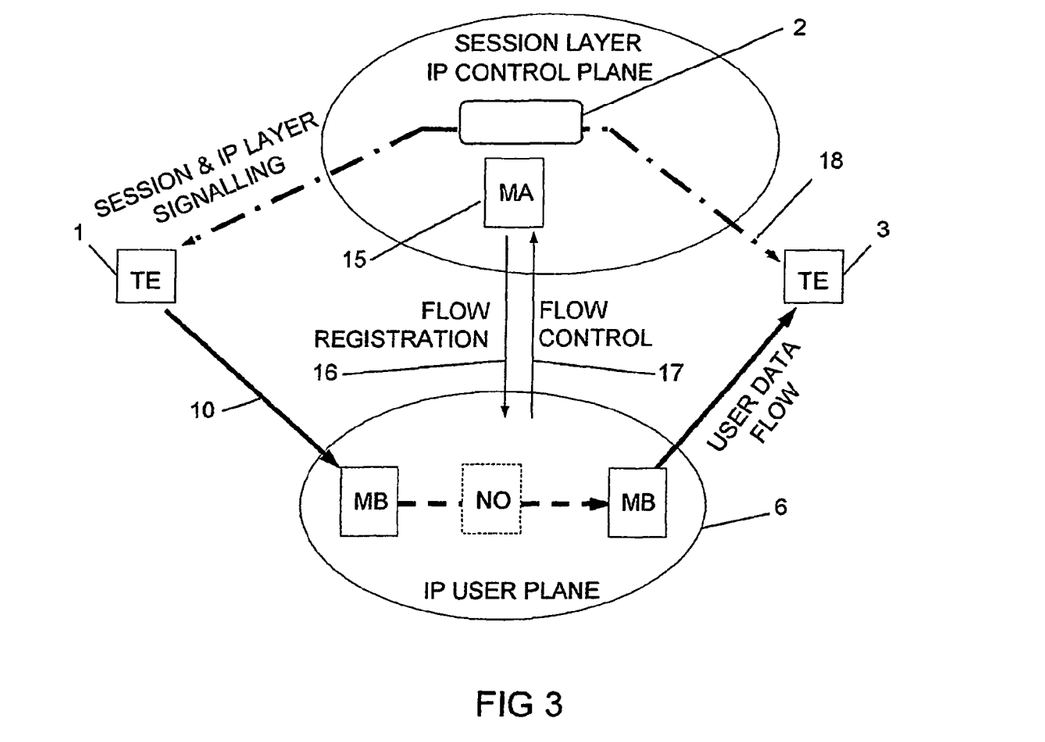

In FIG. 3 a second non-limiting, example embodiment is shown, where the IP control plane 4 is separated from the user data path like in the first non-limiting. example embodiment, but this time the IP control plane and its control nodes, the midcom agent inclusive, is co-located with the session layer and its session control node 2. Also in this embodiment the user data flows register at the middleboxes and nodes they traverse and middleboxes in their turn register at the midcom agent. The user data flow is indicated with the bold double headed arrow 10 while the combined session layer and IP control signalling is indicated with the bold dot-dashed double headed arrow 18.

A main advantage with the non-limiting, example embodiment in. FIG. 3 is that a single common session and IP control layer signalling protocol can be used, thus reducing the number of signalling protocols and the overhead signalling taking place if a separate session protocol and a separate IP control layer signalling protocol are used. The common session and IP signalling protocol bears all information elements needed for the different functions and for the set up of network resources. Since the midcom agent interacts with many different networks that may use many different technologies the common signalling protocol is network independent and contains information elements that are so. The information elements contain sufficient information to translate from various local conditions. As an example consider reservation of bandwidth. Certain networks define bandwidth as peak rate bandwidth while other networks define it as the mean bandwidth.

Figure 4:
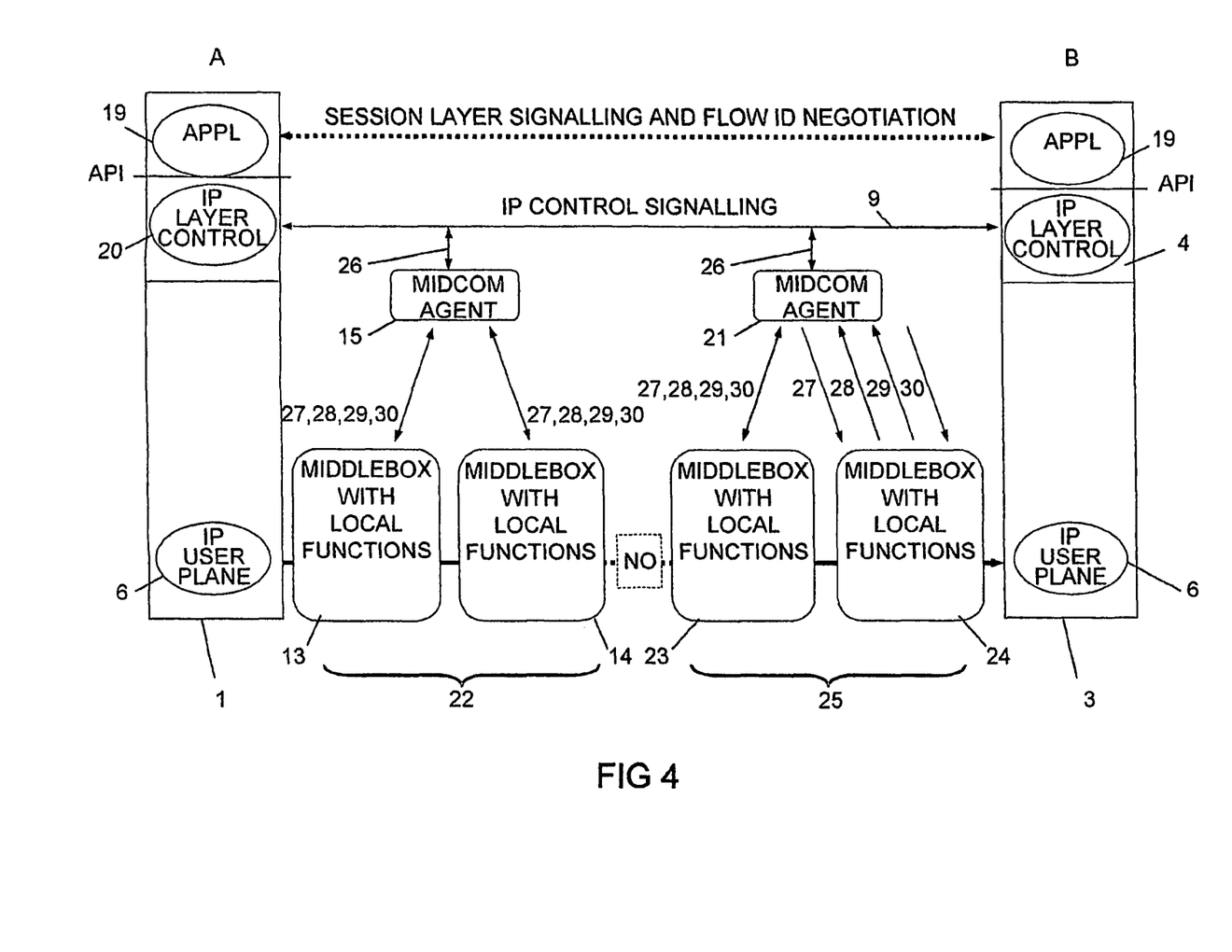

FIG. 4 illustrates in more detail how the signalling between the user terminals 1 and 3 takes place on different planes in accordance with the first non-limiting, example embodiment. In particular a flow registration procedure will be described with reference to the flow diagram of FIG. 5.

In FIG. 4 each user terminal is shown to comprise an application 19, an application program interface API, an IP layer control 20 on the IP control plane, and the IP user data plane 6. There are two midcom agents 15 and 21 on the IP control layer. Midcom agent 15 serves middleboxes 13, 14 which are connected to different non-shown networks. The middleboxes and nodes controlled by the midcom agent 15 and the networks said middleboxes are connected to form a first domain 22. Midcom agent 21 serves middleboxes 23, 24 which are connected to non-shown other networks, different from those in the first domain. The middleboxes and nodes controlled by midcom agent 21 and the networks they are connected to form a second domain 25.

Flow registration is described in general with reference to FIG. 4. The IP layer control 20 signals on the control plane to midcom agents in order to reserve control plane resources for a forthcoming specified user data flow. This is done in order to initiate the control plane and is indicated with the double headed arrow 26. Next the midcom agents send announcements to all middleboxes in its domain as is illustrated by arrow 27. In an announcement the midcom agent announces its presence to the middleboxes so that the middleboxes shall know the entity to which they shall send their registration messages. When the specified flow encounters a middlebox or node it is detected and the middlebox or node sends (1) a middlebox registration message 28 to the midcom agent and (2) a user data flow registration message 29 to the midcom agent. In response the midcom agent sends a control message 30 to the middlebox, said control message comprising instructions how the flow shall be processed and/or handled by the middlebox.

For clarity reasons arrows 27-30 are individually shown at middlebox 24, while they are collectively shown as a single double headed arrow at the rest of the middleboxes.

Figure 5:
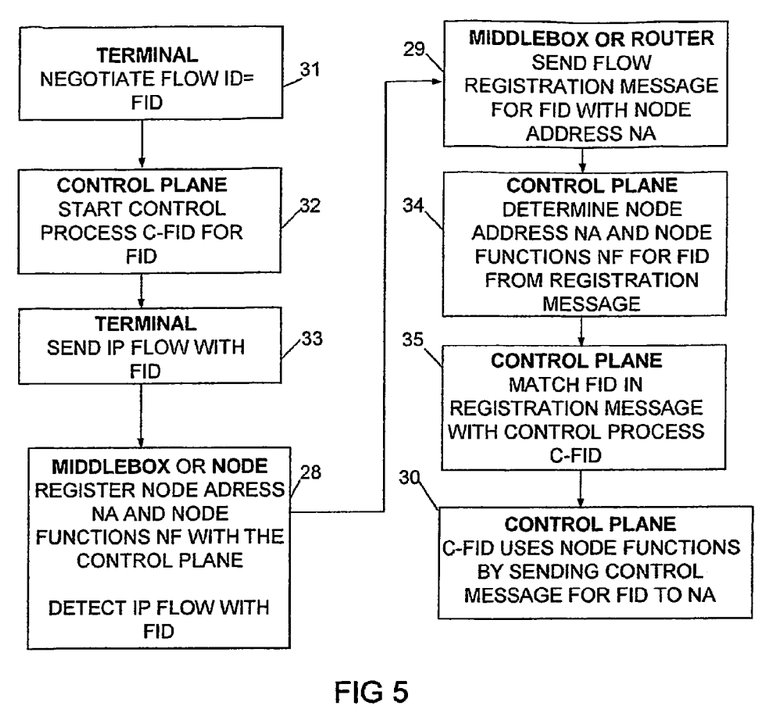

Flow registration is described in more detail in FIG. 5. During the session signalling terminal 1 negotiates with the session controller and the session controller assigns a flow identity FID to the requested communication, step 31. Following the session signalling the control plane is initiated for the specific flow. This is done by initiating a control process, step 32, in the midcom agent, said control process among other things controlling the bandwidth agreed upon during the session signalling. Next the user data flow at user terminal 1 starts, step 33 in the flow diagram. When this has been done and the user flow starts it will be routed through the non-shown access network of terminal 1 and encounter a middlebox, in this case middlebox 13, at which a flow is detected. The middlebox examines the incoming flow in order to establish its identity, for example by reading the source and destination address and possibly also port number in the headers of the incoming packets. Next the middlebox finds the address of the midcom agent and sends a middlebox registration message to the midcom agent, said message containing the identity of the middlebox and its functional capabilities, step 28 corresponding to arrow 28 in FIG. 4. In step 29 that corresponds to arrow 29 in FIG. 4 the middlebox sends a flow registration message for the flow to the midcom agent which optionally in its turn may forward it to the session controller.

The flow identity FID is also used in the IP control plane signalling; the IP control plane matches the flow identity in the session signalling with the flow identity FID in the flow registration message and finds the middlebox functionality to be used for the identified flow, step 34. Next the midcom agent finds the control process to be used for the identified flow at the identified middlebox, step 35. Finally the midcom agent sends a control message to the middlebox that registered, step 30 corresponding to arrow 30, so that this can process the flow correctly. Such control messages sent by the midcom agent are part of the extended midcom protocol.

As illustrated in FIG. 4 the user flow is controlled by the two midcom agents 15 and 21. Midcom agent 15 handles the part of the flow in domain 22 and midcom agent 21 handles the part of the same flow in domain 25. At any given moment there are accordingly two midcom agents that have responsibility for different parts of one and the same flow.

As an alternative to send a flow control message to the reporting middlebox only, the midcom agent can send flow control messages to several or all middleboxes and other nodes along the path of the IP flow. In a mobile multi-access scenario, some of these nodes may enter or leave the path of the flow during the lifetime of a session.

Figure 6:
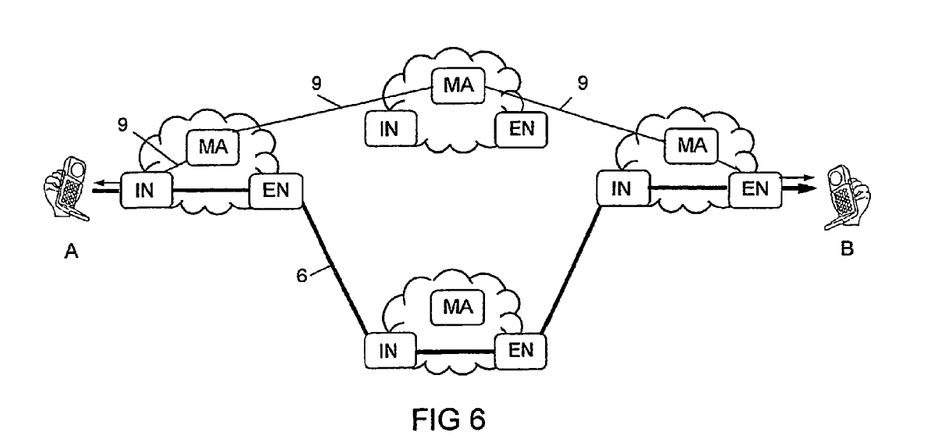

FIG. 6 illustrates a system comprising several domains, each one represented by the cloud network symbol. Each domain has an ingress middlebox, an egress middlebox, a midcom agent and a plurality of non-shown other middleboxes and nodes. FIG. 6 is used to demonstrate a problem that may arise when the user data and control plans are separated. User A and B communicate. User data follow a user data path at the user data plane 6 while routing tables may have indicated that control data shall follow the control signalling path 9 because this path is shorter as seen from a control plane view. This has the consequence that the midcom agent in the bottommost domain receives no control data and therefore cannot control the user data flow therein. In order to avoid this any of the procedures described in FIG. 7 is used.

Figure 7:
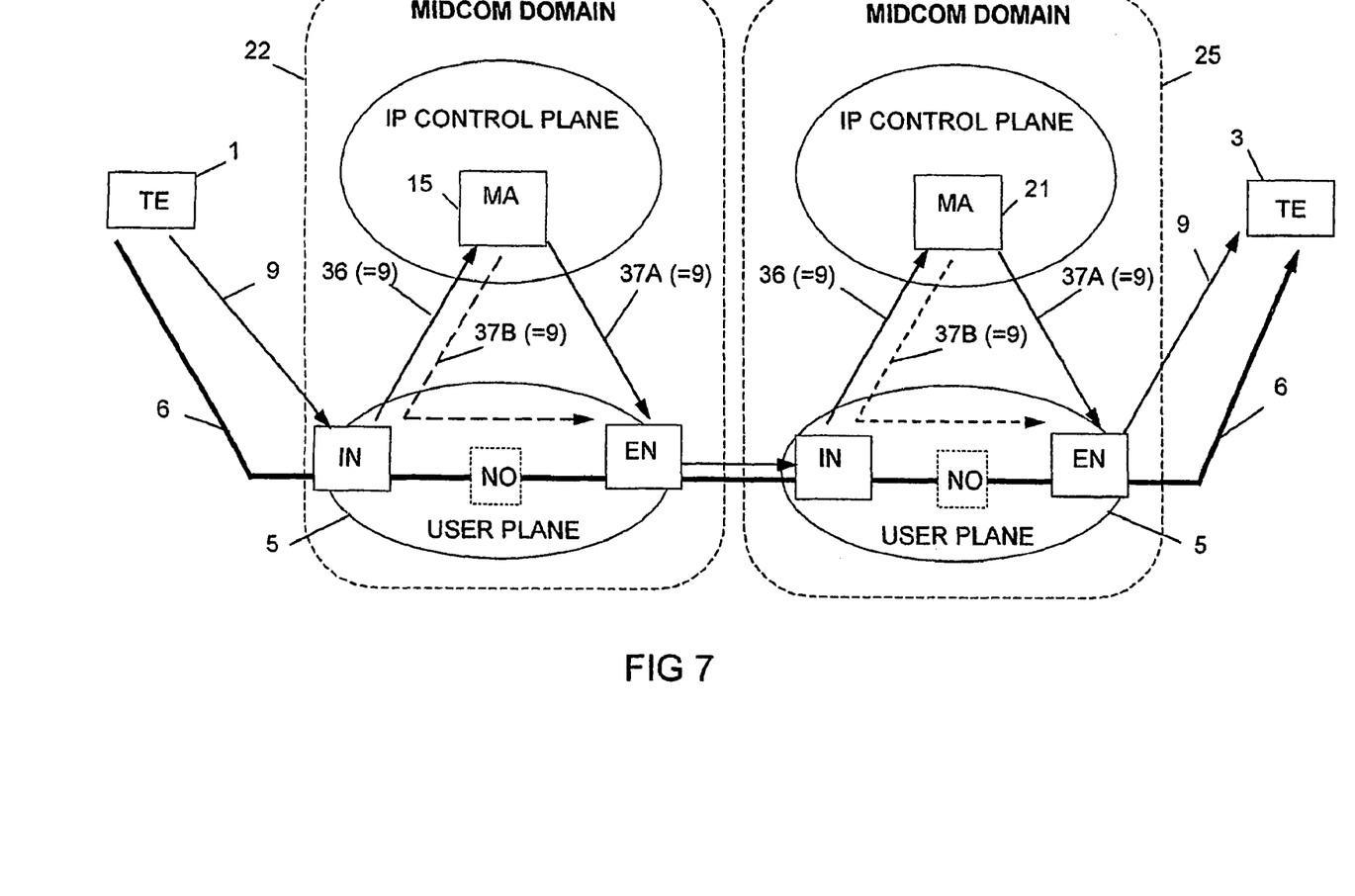

FIG. 7 illustrates IP control layer signalling in general and IP control layer signalling over domains in particular. As defined above a domain consists of the middleboxes that are controlled by one midcom agent. Therefore a domain may also be referred to as a midcom domain. The IP control layer signalling messages must be routed through the same domains as the user data. Moreover, the signalling must be routed through the specific midcom agents that have, or are able to, set up a control session with the middleboxes that the associated user data flow traverses. This can be achieved using the procedure described below (action numeration refers to correspondingly numerated arrows in FIG. 7):

User data and signalling flows are routed jointly.

When a signalling message arrives at the edge of a midcom domain the edge middlebox, ingress middlebox IN in the drawing, filters the signalling message and tunnels it to the midcom agent 15, arrow 36.

The midcom agent 15 processes the signalling message and forwards it according to one of the following alternatives:

alternative a: If the midcom agent has a routing map of its domain, it analyses the destination address of the signalling message and forwards it to the egress middlebox EN, arrow 37A, thereby ensuring that user data and control data exit the domain in one and the same node EN.

alternative b: If the midcom agent does not have a routing map of its domain, it returns the signalling message to the ingress middlebox IN, which forwards it along the same path as the user data, arrow 37B, in which case the routing protocol will send user data and control data to the egress middlebox.

The procedure is repeated each time a new midcom domain is traversed. The user data and the signalling will thus traverse each domain over the same ingress and egress middleboxes. Each ingress middlebox is configured to forward the signalling messages to the midcom agent of the domain.

Separation of the IP control plane from the IP user data plane is made by having the middlebox to analyse each incoming packets with regard to flow identity and packet type, that is whether the packet is a user data packet or a control packet. This information is read from the header of the packet. Control packets are filtered out and tunnelled to the midcom agent.

In FIG. 7 the user data flow is illustrated with the bold arrow 6, while the IP control signalling is illustrated with the thin arrows 9, 36, 37A-B. In inter-domain control signalling the respective midcom agent may perform an address translation to either the ingress or egress middlebox. Ingress and egress refers to the middleboxes at which a specific user flow and its related control flow enters and exits respectively a midcom domain.

Figure 8:
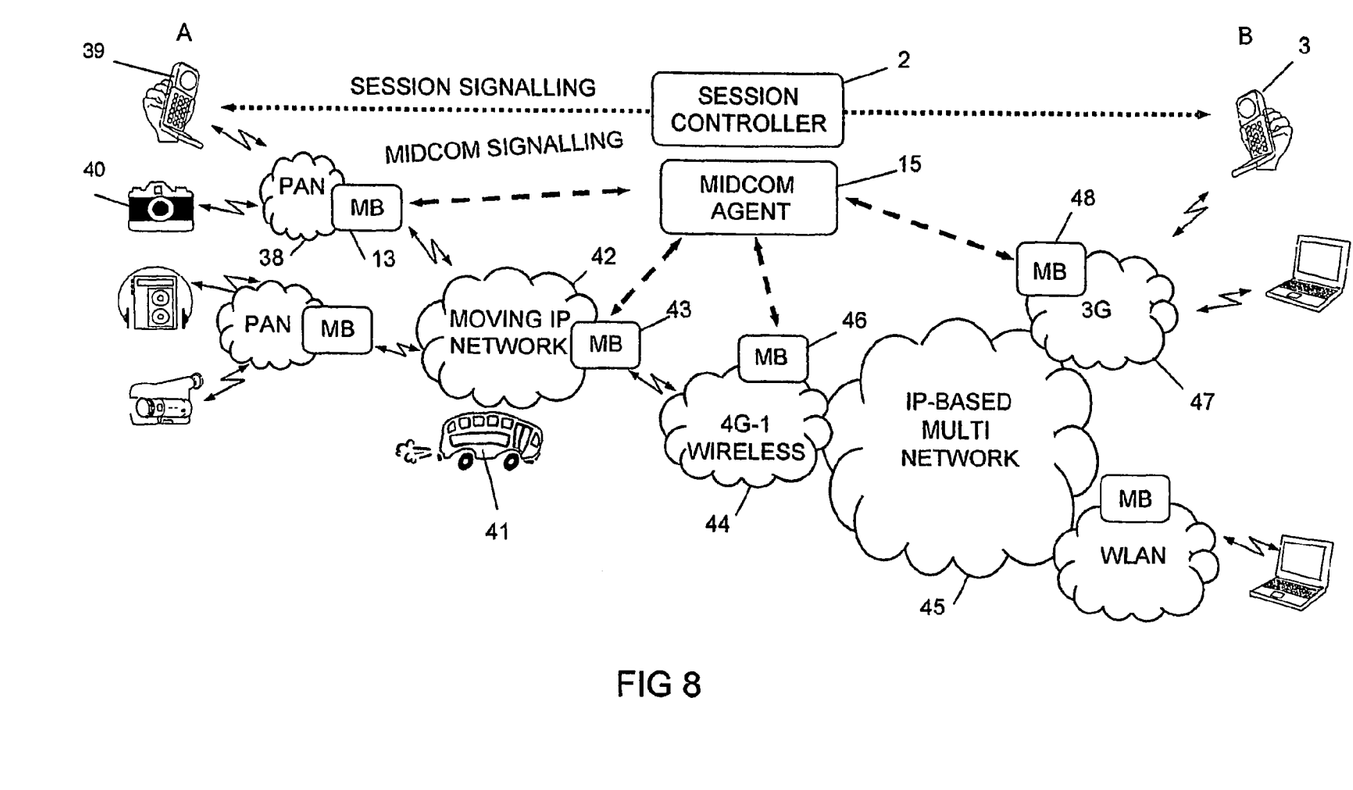

In FIG. 8 a possible scenario is illustrated wherein the middlebox registration process in accordance with the invention is used. A user has a wireless personal access network, PAN, 38 to which for example a cellular telephone 39 and a digital camera 40 is connected. A middlebox 13 is connected to the network 38. The user is onboard a moving vehicle 41 that has an onboard wireless IP based network 42 to which another middlebox 43 is connected. Over an air interface the middlebox 43 communicates with a non-shown middlebox connected to a 4G wireless access network 44, which in its turn is connected to an IP based multi network (backbone network) 45. A middlebox 46 is connected to the 4G network. Terminal 3 of user B, in this case B's cellular telephone, is connected to B's access network, a 3G wireless network 47 to which a middlebox 48 is connected. The middleboxes can signal to a midcom agent 15 using the extended midcom protocol. The session controller 2 allows set up of communication between the shown networks. User A wants to have a telephone conversation with user B and sends a corresponding request to the session controller, which then sets up a path between A and B in the networks 38, 42, 44, 45 and 47 in accordance with the principle discussed above. This path comprises multiple radio hops and a moving network 42 which changes access networks as the vehicle moves in the landscape.

REFERENCES

[1] RFC 3303 "Middlebox communication architecture and framework".
[2] RFC 3304 "Middlebox communications (Midcom) Protocol Requirements".
[3] 3GPP specification 23.207: End-to-end QoS Concepts and Architecture, rev. 5.8.0.
[4] RFC 2748: The COPS (Common Open Policy Service) Protocol.

The invention claimed is:

1. A method for control of mobile packet flows forwarded on an IP-based user plane, where each mobile user data packet flow is separate and different from session set up messages sent with IP layer control signaling and/or session layer control signaling, comprising the steps of:
   a. controlling individual mobile user data packet flows forwarded on the IP-based user plane from a common, IP-based control plane provided with one or more midcom agents, where the common, IP-based control plane is separate from the IP-based user plane, said control being provided by:
   b. each mobile user data packet flow registering its presence in each middlebox it encounters on its way from its source to its destination in the IP-based user plane, and
   c. in response to step b, each middlebox in the IP-based user plane registering itself and the identities of mobile user data packet flows it handles in the IP-based user plane at a midcom agent in the common, IP-based control plane using an extended midcom signalling protocol, and
   d. after step c, the midcom agent signalling control orders to the registered middleboxes, said orders pertaining to the handling of the mobile user data packet flows at respective middleboxes in the IP-based user plane.

2. A method in accordance with claim 1, further comprising the midcom agent sending its control orders to an individual mobile packet flow via the middlebox at which said mobile packet flow registers.

3. A method in accordance with claim 1, further comprising the midcom agent sending its control orders to an individual mobile packet flow via another midcom agent than that at which the mobile packet flow registered.

4. A method in accordance with claim 1, further comprising the midcom agent using the identity of the middlebox that registered in order to find the functionality the middlebox has and provide a corresponding control order that it sends to the middlebox.

5. A method in accordance with claim 1, wherein the midcom agent controls a number of middleboxes provided in a network comprising:
   a. an ingress middlebox, sitting on the edge of the network where an individual mobile packet flow enters the network, filtering out control messages and tunnelling them to the midcom agent, and
   b. the midcom agent, in response sending control messages to each of the middleboxes it controls, dividing the IP layer into an IP control layer and an IP user plane.

6. A method in accordance with claim 1, further comprising the midcom agent using a routing table to send control messages to the respective middleboxes on the IP control plane using an extended midcom protocol.

7. A method in accordance with claim 1, further comprising the midcom agent sending control messages to the middleboxes by first sending them to the ingress middlebox from which they are sent in the same channel as the user data.

8. A method in accordance with claim 1, wherein a domain comprises middleboxes and a midcom agent, the method further comprising:
   a. forwarding control messages from one domain to another by having an ingress middlebox, sitting on the edge of a network at which an individual mobile packet flow enters,
   b. filtering out control messages and tunnelling them to the midcom agent, and
   c. the midcom agent forwarding them to an egress middlebox at which the mobile packet flow exits the network.

9. A method in accordance with claim 8, further comprising exchanging step c. for a step of returning a control message to the ingress middlebox from where it is forwarded along a same path as the user data flow.

10. A method in accordance with claim 1, further comprising plural midcom agents, provided at the IP control plane, simultaneously controlling one and the same mobile packet flow.

11. A midcom agent comprising a plurality of control function sets, each set relating to the operation of an individual middlebox, and comprising control orders for control of the operation of the corresponding middlebox according to the method claimed in claim 1.

12. A communication system comprising:
   a plurality of IP based networks;
   a session controller for set up of a communication path that traverses selected one of the networks, each selected network having an ingress middlebox at which a user data packet flow enters the network and an egress middlebox at which the flow exits the network, where the user data packet flow is separate and different from session set up messages sent with IP layer control signaling and/or session layer control signaling,
   each network comprising:
      a midcom agent located in an IP control plane,
      a plurality of middleboxes located in an IP user plane separate from the IP control plane,
      an extended midcom protocol allowing for communication between the midcom agent and the middleboxes,
   wherein said middleboxes are configured to detect a user data packet flow forwarded on the IP-based user plane and register its identity at the midcom agent located in the IP control plane together with the identity of the middlebox at which the user data packet flow was detected, and
   wherein said midcom agent, in response to a combined flow and middlebox registration, is configured to send a flow control order to the middlebox in the IP-based user plane using the extended midcom protocol, said flow control order instructing the middlebox how to handle the detected user data packet flow in the IP-based user plane.

13. The communication system in claim 12, wherein the user data packet flow is a mobile packet flow, and wherein in response to movement of a mobile terminal associated with the mobile packet flow, a new middlebox in the IP-based user plane is configured to detect the mobile packet flow and register the identity of the mobile packet flow and the identity of the new middlebox with the midcom agent located in the IP control plane, and the midcom agent is configured to send a flow control order to the new middlebox instructing the new middlebox how handle the detected flow.

14. The communication system in claim 12, wherein the user flow is a mobile packet flow, and wherein in response to movement of a network associated with the mobile packet flow, a new middlebox in the IP-based user plane is configured to detect the mobile packet flow and register the identity of the mobile packet flow and the identity of the new middlebox with the midcom agent located in the IP control plane, and the midcom agent is configured to send a flow control order to the new middlebox instructing the new middlebox how handle the detected flow.

15. A midcom agent located in a control plane for controlling mobile user data packet flows over an IP-based user plane separate from the control plane, where each mobile user data packet flow is separate and different from session set up messages sent with IP layer control signaling and/or session layer control signaling, comprising electronic circuitry configured to:
  receive a middlebox registration message from each of multiple middleboxes in the IP-based user plane;
  register each middlebox for which a middlebox registration message is received;
  receive from each of the registered middleboxes the identities of one or more mobile user data packet flows being handled by each of the registered middleboxes in the IP-based user plane in response to the middleboxes receiving the one or more mobile user data packet; and
  signal a control order to each of the registered middleboxes for handling the mobile user data packet flows at each of the registered middleboxes.

16. A midcom agent in accordance with claim 15, wherein the midcom agent is configured to send its control orders to an individual mobile user data packet flow via the middlebox at which said mobile packet flow registers.

17. A midcom agent in accordance with claim 15, wherein the midcom agent is configured to use the identity of the middlebox that registered in order to find the functionality the middlebox has and provide a corresponding control order that it sends to the middlebox.

18. A midcom agent in accordance with claim 15, wherein the midcom agent is configured to control a number of middleboxes provided in a network comprising:
  a. an ingress middlebox, sitting on the edge of the network where an individual mobile packet flow enters the network, filtering out control messages and tunnelling them to the midcom agent, and
  b. the midcom agent, in response sending control messages to each of the middleboxes it controls, dividing the IP layer into an IP control layer and an IP user plane.

19. A midcom agent in accordance with claim 15, wherein the midcom agent is configured to use a routing table to send control messages to the respective middleboxes on the IP control plane using an extended midcom protocol.

20. A middlebox for controlling mobile user data packet flows over an IP-based user plane, where each mobile user data packet flow is separate and different from session set up messages sent with IP layer control signaling and/or session layer control signaling, comprising electronic circuitry configured to:
  receive a midcom agent announcement message, the midcom agent located in a control plane separate from the IP-based user plane in which the middlebox is located;
  send a middlebox registration message to the midcom agent;
  In response to receiving one or more mobile user data packet flows, send a mobile user data packet flow registration message to the midcom agent for the one or more mobile packet user data flows being handled by the middlebox in the IP-based user plane; and
  receive a control message from the midcom agent in the control plane for handling the one or more mobile user data packet flows in the IP-based user plane.

* * * * *

UNITED STATES PATENT AND TRADEMARK OFFICE
CERTIFICATE OF CORRECTION

PATENT NO. : 8,155,116 B2  
APPLICATION NO. : 10/583962  
DATED : April 10, 2012  
INVENTOR(S) : Eriksson et al.

Page 1 of 1

It is certified that error appears in the above-identified patent and that said Letters Patent is hereby corrected as shown below:

In Fig. 5, Drawing Sheet 4 of 6, for Tag "28", in Line 2, delete "ADRESS" and insert -- ADDRESS --, therefor.

In Column 4, Line 7, delete "mideom" and insert -- midcom --, therefor.

In Column 4, Line 65, delete "function" and insert -- functions --, therefor.

In Column 5, Line 29, delete "Instead,the" and insert -- Instead, the --, therefor.

In Column 5, Line 66, delete "non-limiting. example" and insert -- non-limiting, example --, therefor.

In Column 12, Line 26, in Claim 1, delete "In" and insert -- in --, therefor.

Signed and Sealed this  
Thirtieth Day of October, 2012

David J. Kappos  
*Director of the United States Patent and Trademark Office*